Figure 4:
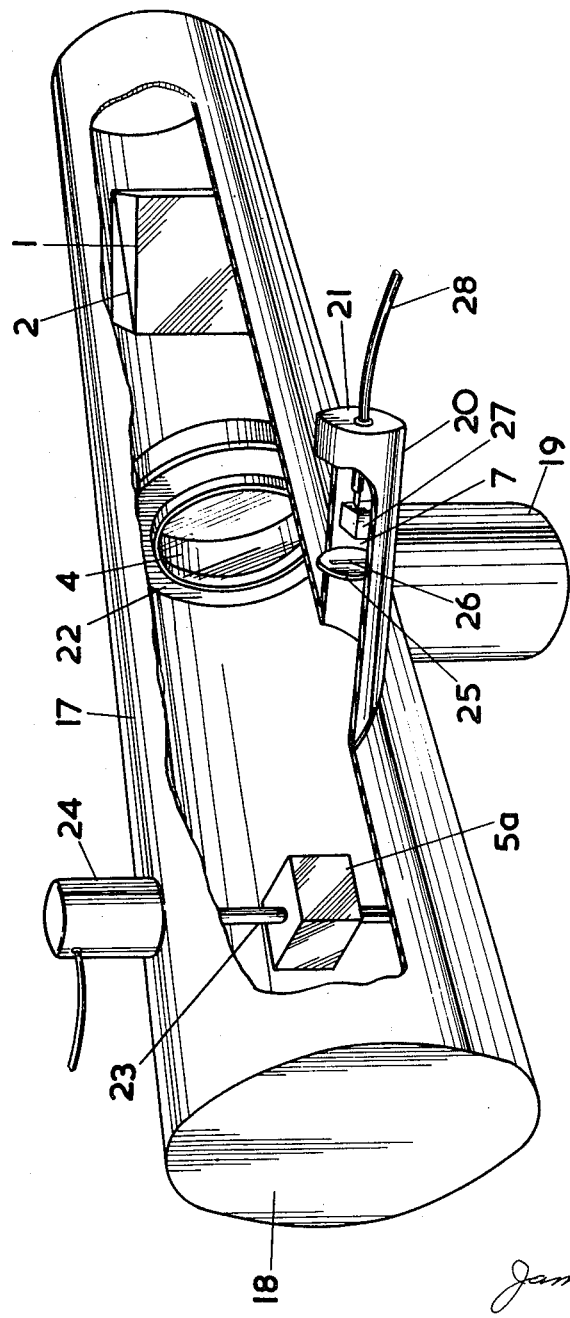

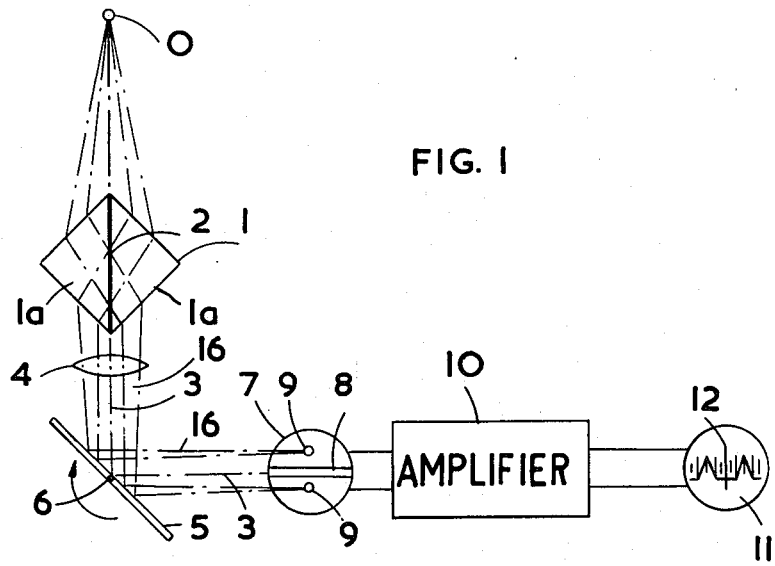
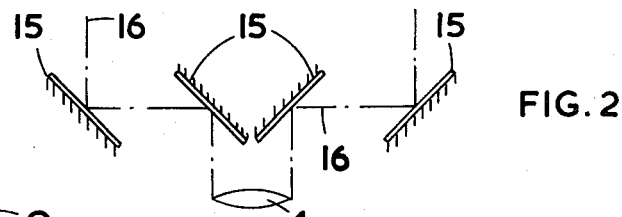
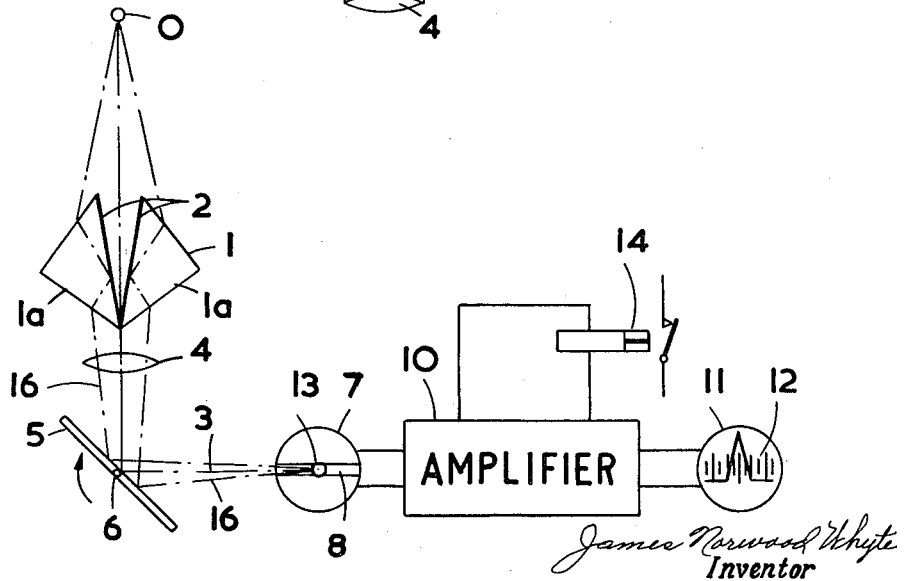

united States Patent Office 3,227,033
Patented Jan. 4, 1966

3,227,033
PHOTOELECTRIC TIME RESOLUTION RANGEFINDERS
James Norwood Whyte, Otford, Sevenoaks, Kent, England, assignor to Her Britannic Majesty's Principal Secretary of State for the War Department, Whitehall, London, England
Filed Aug. 8, 1961, Ser. No. 130,130
Claims priority, application Great Britain, Aug. 15, 1960, 28,152/60
10 Claims. (Cl. 88—1)

This invention relates to rangefinders.

Several known forms of rangefinder employ an optical system which produces two images of the object whose range is required, the separation of the images being a function of the range. The range is normally computed either from measurement of the separation of the images or from the degree of adjustment necessary to bring the images into coincidence.

The present invention provides a rangefinder wherein the range is computed by time resolution of separated images and includes an optical system for producing two separated images of the object whose range is required the separation of which images is a function of the range; a rotatable mirror onto which the images are arranged to be projected and a detector over which the images are arranged to be swept by the mirror as it rotates and which will produce an electrical pulse at the passage of each image.

The optical system for producing the separated images may be one of the usual arrangements of mirrors or prisms or may be a device, hereinafter called a mirror prism, comprising a pair of isosceles optical prisms having silvered bases and mounted in base to base juxtaposition. The simple form of mirror prism, in which the silvered bases of the component prisms are in contact, will, when the line of sight lies in the silvered interface, produce two images of an object at any range other than infinity. A modified mirror prism in which the bases of the component prisms are inclined to one another coincident images a range other than infinity, which range is a function of the inclination of the bases. This latter effect can also be achieved by varying the inclinations of mirrors or prisms in the more usual arrangements for rangefinder objectives.

The detector slit may incorporate a photo-electric transducer, the pulses from which may be used in a variety of ways. For example, the pulses may be amplified and displayed on an oscillograph carrying a scale from which the range can be read, or they may be fed to a microsecond counter or to an electronic computing device which can be arranged, in known manner, to compute range and rate of approach.

One form of rangefinder in accordance with the invention, will now be more particularly described, by way of example only, with reference to the accompanying drawings in which:
FIG. 1 is a diagrammatic drawing of a rangefinder.
FIG. 2 is an alternative objective system.
FIG. 3 is a diagrammatic drawing of a modified form of rangefinder, and
FIG. 4 is a perspective view, partly broken away, of a rangefinder. As shown in FIG. 1, the optical system for producing the separated images consists of a simple mirror prism 1 comprising a pair of isosceles, right-angled, optical prisms 1a having silvered bases 2 and fixed together, base to base. The line of sight or optical axis 3 of the system is arranged to lie in the plane of the silvered interface 2 of the mirror prism 1. A suitable lens, or lens system 4 may be incorporated for focusing the images. A rotatable mirror 5 is arranged in the path of the rays 16 transmitted by the optical system, its axis of rotation 6 being perpendicular to and intersecting the optical axis 3 of the system. A slit detector 7 is so positioned that, at some angular position of the mirror 5, the said optical axis 3 is reflected centrally into the slit 8. The slit detector 7 incorporates a photo-electric transducer which will produce an electrical pulse when the light falling upon the slit 8 changes in intensity.

In operation, when the rangefinder is trained on an object O at a range other than infinity, the mirror prism 11 will produce two images 9 of equal intensity, equally disposed about the optical axis 3, their separations being inversely proportional to the range. The images 9, on being swept over the detector slit 8 by the rotating mirror 5 produce two electrical pulses, the time interval between the pulses being inversely proportional to the range. The pulses are fed to an amplifier 10 and thence to a recording or indicating computer, which may be of a known type, to compute the range of the object. The computer may be an oscillograph 11 carrying a suitable scale 12 from which the range may be read directly.

It will be appreciated that such a rangefinder will only be effective if the object is such as to produce well defined, identifiable pulses. The object must therefore be such as will produce a definite change in light intensity and must be of a shape which will produce an identifiable pulse. The rangefinder will be particularly effective in ranging, for example, a small light source against a darker background.

The mirror prism 1 may be replaced by one of the usual mirror or prism arrangements, for example, such as that shown diagrammatically in FIG. 2, and the base of the optical system may be increased to provide better resolution.

In a modification the mirror prism is of the type shown in FIG. 3, in which the silvered bases 2 are inclined to one another in order to produce a single image 13 at some predetermined range of the object O. In this case an approaching or receding object will give rise to two pulses separated by a time interval which will decrease as the object approaches the said predetermined range. The rate of change of the time interval will provide a measure of the rate of approach or recession. At the predetermined range the two pulses will be superimposed to form a single pulse of double amplitude which pulse may be used to actuate a trigger switch 14, for example, to operate the shutter of a camera focused at the said range or to fire a gun. If, when using a single sided mirror 5 the duration of the double pulse, due to the rapidity of approach of the object, is less than the period of revolution of the mirror, the pulse could fail to register on a single detector 7. This problem may be overcome by the use of an array of detectors arranged around the axis of rotation of the mirror or by the use of a multisided block in place of a simple mirror.

In this modification, the mirror prism 1 may also be replaced by one of the usual optical systems FIG. 2 using mirrors 15 or prisms, the predetermined range being fixed by the inclination of the component mirrors or prisms. Alternatively a mirror prism of the type comprising a pair of composite prisms in each of which is inserted a wedge of material of different refractive index may be used. This last alternative has however the disadvantage that the predetermined range can only be altered by replacement of the mirror prism whereas each of the other optical systems can be made adjustable.

The rangefinder shown in FIG. 4 consists essentially of a mirror prism 1, a focusing lens 4, a rotatable multisided mirror 5a and a slit detector 7 all mounted within a casing. The casing comprises a main cylindrical tube 17, closed at one end 18 and carried on a stem 19 for attachment to a suitable mounting (not shown), and a small side tube 20 communicating with the main tube and closed at its outer end 21.

The simple mirror prism 1 is fixed within the main tube 17, near its open end, and the silvered interface 2 lies in the vertical diametral plane of the tube 17. The lens 4, held in a mounting 22 is fixed coaxially with the tube 17 between the closed end 19 and the mirror prism 1. The multi-sided mirror 5a is mounted centrally within the tube 17 near its closed end 19, upon a rotatable spindle 23. The spindle 23 which is mounted in the vertical diametral plane of the tube 17 extends through the upper part of the tube where it is drivably connected to a small electric motor 24 mounted on the outside of the tube 17.

The side tube 20 is disposed obliquely to the main tube 17, the axis of the side tube 20 lying in the horizontal plane of the main tube 17 and intersecting the rotary axis of the mirror 5a. Within the side tube 20 is mounted a mask 25 in which is a vertical slit 26 and, on the side of the mask remote from the main tube 17, a photoelectric detector 27, leads 28 from which are carried through the closed end 21 of the side tube 20. Preferably the inner surfaces of both main and side tubes 17, 20 are blackened to avoid the possibility of obtaining signas from stray reflections. The leads 28 may be connected, as shown in FIG. 1, to an amplifier and recording apparatus.

In any of the above arrangements the time interval measured may be either that between the pulses corresponding to the images of a pair or that between the pulse corresponding to the passage of the second image of a pair and the pulse corresponding to the succeeding passage of the first image of the pair over the detector.

The mirror prism may be made of glass or, for special purposes, of other suitable material such, for example, as arsenic trisulphide. With a mirror prism of arsenic trisulphide, the available aperture is substantially equal to the width of the mirror prism, measured perpendicular to the silvered interface, if the base angles of the component prisms are 35°.

I claim:

1. A rangefinder comprising a rangefinder objective optical system for producing a pair of images of an object whose range is to be determined, the separation of which images is a function of the said range; a single rotatable reflector onto which image forming rays from both said images are projected; and a detector in the focal plane of said system, over which the images are successively swept by said reflector as it rotates, for producing an electrical pulse at the passage of each image, the time interval between two successive pulses being a measure of the said range.

2. A rangefinder as claimed in claim 1 wherein the rangefinder objective system includes a mirror prism for producing the pair of images, said mirror prism comprising a pair of isosceles optical prisms having silvered bases and mounted in base to base juxtaposition, the planes of the bases being symmetrically disposed with respect to the optical axis of the said system.

3. A rangefinder as claimed in claim 1 wherein the detector comprises a mask in which is formed a slit aperture and a photo-electric transducer mounted behind the slit.

4. A rangefinder as claimed in claim 1 wherein the rangefinder objective system is preset to a predetermined range at which the two images are superimposed whereby the detector will produce a pulse of increased amplitude when the object is at said predetermined range.

5. A rangefinder as claimed in claim 4 wherein the rangefinder objective system includes a mirror prism for producing the said images, said mirror prism comprising a pair of isosceles optical prisms having silvered bases and mounted in base to base juxtaposition, the said bases being inclined to one another and the angle between them being bisected by the optical axis of the said objective system.

6. A rangefinder as claimed in claim 4 having a triggering switch connected to the detector and actuable by the pulse of increased amplitude.

7. A rangefinder comprising a rangefinder objective optical system for producing a pair of images of an object whose range is to be determined, the separation of which images is a function of said range; a single rotatable reflector onto which image forming rays from both said images are projected for sweeping said images about its rotary axis; a detector in the focal plane of said system, over which the images are successively swept by the reflector as it rotates, for producing an electrical pulse at the passage of each image; and means for measuring the time interval between two successive pulses and computing the range of the object.

8. A rangefinder comprising a mirror prism for producing a pair of images of an object whose range is to be determined which mirror prism consists of a pair of isosceles optical prisms having silvered bases and cemented together base to base; a lens system for focusing the images, the optical axis of the lens system lying in the plane of the silvered interface of the mirror prism; a reflector rotatable about an axis perpendicular to and intersecting the optical axis of the lens system for sweeping the images about its rotary axis; a photo-electric detector, mounted in the focal plane of the lens system and in the plane containing the optical axis of the lens system and perpendicular to the rotary axis of the reflector, for producing an electrical pulse at the passage thereover of each image; and means for measuring the time interval between successive electrical pulses and computing the range of the object.

9. A rangefinder comprising a mirror prism for producing a pair of images of an object whose range is to be determined, said mirror prism consisting of a pair of isosceles optical prisms having silvered bases and mounted with said bases inclined to one another, whereby the images are superimposed at a predetermined, finite range of the object; a lens system for focusing the images, the optical axis of the lens system bisecting the angle between the said silvered bases; a rotatable reflector, whose rotary axis is perpendicular to, and intersecting the optical axis of the lens system, for sweeping the images about its rotary axis; a photo-electric detector, mounted in the focal plane of the lens system and in the plane containing the optical axis of the lens system and perpendicular to the rotary axis of the reflector for producing an electrical pulse at the passage of each image and a pulse of increased amplitude at the passage of the superimposed images when the object is at the said predetermined range; means for measuring the time interval between two successive pulses and computing the range of the object; and a triggering switch connected electrically to the detector and actuable by the pulse of increased amplitude.

10. A rangefinder comprising a casing; a main, cylindrical tube forming part of said casing and closed at one end; a mirror prism for producing a pair of images of an object whose range is to be determined, which mirror prism consists of a pair of isosceles optical prisms having silvered bases and cemented together base to base, said mirror prism being fixed within said main tube with the silvered interface lying in a diametral plane of said main tube; a lens mounted co-axially within said main tube between the closed end thereof and the mirror prism for focusing the pair of images; a rotary spindle mounted within said main tube in the diametral plane thereof which contains the silvered interface of the mirror prism, one end of the spindle extending externally of the casing; an electric motor mounted outside the casing and drivably connected to the rotary spindle; a multi-sided mirror fixed to the rotary spindle, the axis of the main tube passing through said mirror, for sweeping the pair of images about the axis of the spindle; a side tube extending outwardly from and communicating with the interior of the main tube, the axis of which side tube is perpendicular to and intersecting the rotary spindle, said side tube being closed at its outer end; a mask across the side tube in which mask is formed a slit parallel to the rotary spindle; a photo-electric detector in the focal plane of said lens and within the side tube on the side of the mask remote from the main tube for producing an electrical pulse at the passage of each swept image across the slit; leads connected to the photo-electric detector and carried through the outer end of the side tube for connection to an amplifier and recording instrument for measuring the time interval between two successive electrical pulses; and means for attaching the casing to a suitable mounting.

References Cited by the Examiner
UNITED STATES PATENTS

| | | | |
|---|---|---|---|
| 1,532,236 | 4/1925 | Douglass | 88—1 |
| 2,401,691 | 6/1946 | Luboshez | 88—2.7 |
| 2,786,096 | 3/1957 | Palmer | 88—2.6 |
| 2,830,487 | 4/1958 | Griffith | 88—1 |
| 2,942,514 | 6/1960 | Brandon | 88—1 |
| 2,972,924 | 2/1961 | Clemens | 88—1 |

JEWELL H. PEDERSEN, *Primary Examiner.*